United States Patent [19]

Roche

[11] Patent Number: 4,607,760

[45] Date of Patent: Aug. 26, 1986

[54] CLOSURE FOR A PRESSURIZED CHAMBER

[76] Inventor: John N. Roche, 37 Manorview Dr., Greenville, Pa. 16125

[21] Appl. No.: 759,028

[22] Filed: Jul. 25, 1985

[51] Int. Cl.⁴ ............................................. B65D 45/28
[52] U.S. Cl. .................................... 220/314; 105/377; 49/465
[58] Field of Search ............... 220/314, 234, 244, 315, 220/235, 251, 316, 238; 105/377; 49/465

[56] References Cited

U.S. PATENT DOCUMENTS

| | | | |
|---|---|---|---|
| 3,045,861 | 7/1962 | Dieter et al. | 220/314 |
| 4,279,356 | 7/1981 | Amorese et al. | 49/465 |
| 4,325,491 | 4/1982 | Barnhill | 220/316 |
| 4,543,889 | 10/1985 | Fritz | 105/377 |

Primary Examiner—George T. Hall

[57] ABSTRACT

A door closure system for a pressurized chamber is provided. The door system includes a hinge affixed to the chamber housing which supports a transverse door beam of the door. An inner door plate is supported by a handwheel driven screw rotatably mounted to the door beam. As such, the door plate is displaceable between sealing, chamber opening confronting and open positions by the handwheel. A cam finger is provided on the door plate and the free end of the door beam is formed into latch hooks. A spring-biased swing latch is provided adjacent the chamber opening on the side of the chamber opposite the hinge means. The swing latch includes a latch bar and a recessed cam area. Accordingly, when the door plate is rotated into its confronting position and the handwheel is turned thereby advancing the door plate relative to the chamber opening, the cam finger is caused to ride in the recessed cam area of the swing latch. Such movement causes the swing latch to be rotated thereby causing the latch bar to engage and retain the latch hooks. Further rotation of the handwheel causes a sealing means on the door plate to sealingly engage the chamber opening.

10 Claims, 5 Drawing Figures

CLOSURE FOR A PRESSURIZED CHAMBER

BACKGROUND OF THE INVENTION

1. Field of the Invention

The present invention relates to closures for chambers and, more particularly, to apparatus for moving and securing a door to an opening of a chamber which may be pressurized.

2. Description of the Prior Art

There exists a wide variety of chambers adapted for maintaining a desired level of pressure therewithin. An example of such a chamber is a sterilizer that operates under pressure during at least part of its cycle. To enable pressure to build within the chamber of, e.g., a sterilizer, it is necessary to provide a seal against fluid flow from the chamber to the atmosphere through the area between the perimeter of the chamber opening and the door of the sterilizer. Typically, such a seal is effected by disposing a sealing device between the perimeter of the opening and the door. The sealing device is usually attached to either the perimeter of the opening or the chamber door. Generally, one of two types of sealing devices is used to effect the fluid seal. The first type, a compression seal, requires that compressive force be exerted on the seal by the door and the perimeter of the opening to the chamber. The second type, a noncompressive seal, does not require the exertion of such a compressive force, but requires only that the seal contact the surfaces of both the perimeter of the opening and the door.

The conventional designs of closures for such sterilizers generally fall into several different categories. For example, one previous design of a sterilizer door closure system includes a bar mounted across the outer face of a door and extending from a vertical hinge on one side thereof to a horizontal "U"-shaped slot on the other. Such slot is intended to be engaged by a large pressure nut provided on a horizontally pivotal swing bolt. In operation, the door is pivoted about the hinge to a position in engagement with the opening of the chamber, the swing bolt is moved into the slot on the door bar and the pressure nut is rotated into compressing relation with the end of the door bar.

It must be noted, however, that various problems exist with such a system. First, as the compressive force generated by the pressure nut is caused to bear on only a localized area of the door bar, it is difficult to achieve an even sealing pressure around the entire perimeter of the door. Second, such a design requires many turns of the large pressure nut to achieve sealing. Such a time- and effort-intensive process causes excessive delays in the sterilization process which reduces the sterilizer's overall capacity. Also, the swing bolt/pressure nut design is necessarily limited to small pressure chambers because the design is unable to effect satisfactory sealing of a large opening and requires an inordinate number of turns of an effort applied to the pressure nut.

Another conventional door design for a pressurized chamber also includes a bar extending across the outside of the door. The door is supported by the bar which, in turn, is supported at one end by a loose fitting hinge. The door is secured to the opening of the chamber by means of a pin mounted on the chamber on the opposite side of the opening from the hinge. To operate such a door, the door is closed by means of a handle affixed to the door bar adjacent its free end and the door is lifted onto the pin adjacent the opening so that an aperture in the door bar engages the pin. A handwheel is then used to bring pressure onto the door and to urge it into sealing engagement with the chamber opening.

As will be appreciated, various problems are also present with such a door closure design. For example, due to the fact that a loose fitting hinge is required to allow the door to be lifted onto the pin, it is more difficult to achieve effective sealing with such design. Also, the requirement that a heavy pressure door must be manually lifted into engagement with the pin requires an inordinate amount of operator effort. Obviously, such a door closure design may only be employed on small pressure chamber doors due to the sealing considerations and the door weight which must be lifted.

Yet another pressure chamber door closure system includes a vertically slidable knife-type door which slides in vertical rails along the edges of the opening. This system is costly to manufacture as it requires the provision of a counterweight for the door. Also, a door closure system according to such a design is not suitable for usage on small chamber doors due to the excessive costs and additional parts associated therein.

A final example of a conventional closure for a pressure chamber, such as a sterilizer, includes a cluster of radial arms or bolts, one end of which is attached to a circular central hub upon which a threaded nut is mounted. The nut travels along a threaded doorpost which is mounted to the door plate. The door is closed tightly against the chamber by rotating a handwheel that is mounted on the threaded nut for several revolutions. An initial rotation of the handwheel causes the central hub to rotate and push the free ends of the radial arms into a frame mounted on the sterilizer shell and to secure the door in a position in which the door confronts the sterilizer opening, but in which the door does not seal the sterilizer. Further rotation of the handwheel pushes the door against the perimeter of the chamber opening.

The nut, the threaded doorpost and the associated closing apparatus are bulky and expensive to manufacture; further, since the mechanism must transfer the torque applied to the handwheel to a linear force exerted against the door through the threaded doorpost, the user must rotate the handwheel through a number of revolutions to secure the door against the perimeter of the chamber opening.

The subject invention is directed toward an improved apparatus for securing the door of a chamber capable of maintaining pressure within the chamber, such as a sterilizer, against the perimeter of the opening of the chamber which overcomes, among others, the above-discussed problems and which is effective to positively secure the chamber door while requiring a minimal amount of user effort.

SUMMARY OF THE INVENTION

In accordance with the present invention there is provided a door closure system for the door of a chamber capable of maintaining pressure therein, such as a sterilizer. Further, the present invention may be used on a variety of sizes and applications of pressure chambers.

The present invention includes a door pivotally mounted on a vertical hinge and displaceable between a sealed position, a confronting position in which the door is in facing relation to the opening of said chamber, and an open position. The door includes a lateral door beam which supports an inner door plate by means of an Acme screw. A cam finger is provided on the door plate and latch hooks are provided on the opposite edge of the door from the hinge means. In addition, a handwheel is mounted to the end of the Acme screw opposite the door plate in order to move the door plate between its confronting and sealed positions. A spring loaded detent is provided to retain the door in its confronting position. A spring biased swing latch is affixed to the chamber on the opposite side of the opening from the hinge means and includes a cam surface and a latch bar. The swing latch is displaceable between open and latched positions.

In operation, the door is displaced from its open to its confronting positions and retained there by the detent. As the handwheel is rotated the door plate is moved inward toward the chamber opening thereby causing the cam finger to engage the cam surface of the swing bolt which causes the swing bolt to move from its open to its latched position and the latch bar to increasingly engage the latch hooks. When in its latched position, the latch bar on the swing latch completely engages and retains the latch hooks on the door beam thereby providing pressure support for the door in order that the door handwheel may be continued to be rotated to move the door plate to its fully sealed position.

As such, the present invention provides an effective, easy to use door closure system for a chamber to which pressure is to be applied. In view of the efficient design of the present invention, the manufacturing cost therof is less than competing door designs while providing superior door sealing and ease of operator use.

These and other details, objects, and advantages of the present invention will become apparent as the following description of the present preferred embodiment thereof proceeds.

BRIEF DESCRIPTION OF THE DRAWINGS

In the accompanying drawings, I have shown a present preferred embodiment of the invention wherein.

DETAILED DESCRIPTION OF THE PREFERRED EMBODIMENTS

Figure 5:
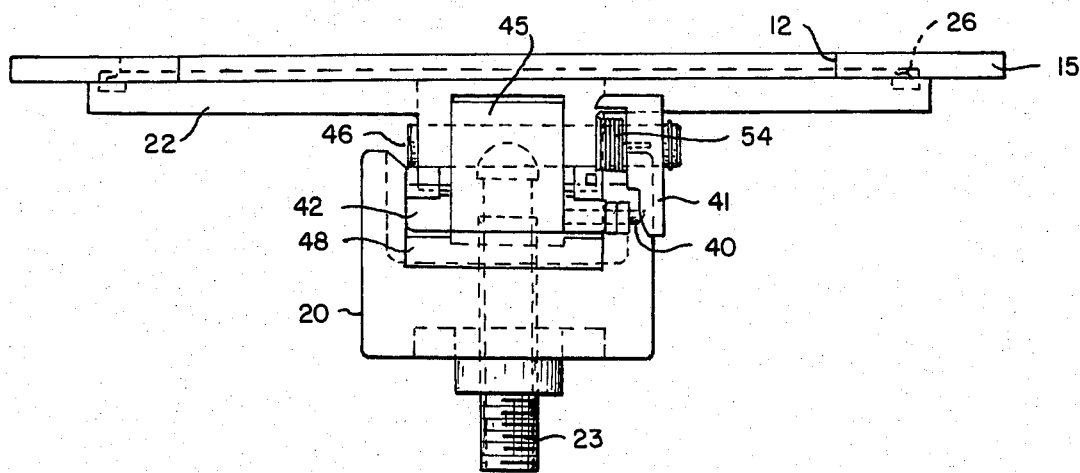
FIG. 5 is a side elevation view of the door closure system provided.

For purposes of illustration only and not limitation, the preferred embodiment of the present invention will be described below as embodied in a sterilizer chamber having a hinged swinging door secured thereto.

Referring now to the drawings wherein the showings are, agian, for purposes of illustrating the present preferred embodiment of the invention only and not for purposes of limiting same, the figures show a door 10 for closing and sealing an opening 12 of a chamber 14 of a chamber housing 15.

Figure 1:
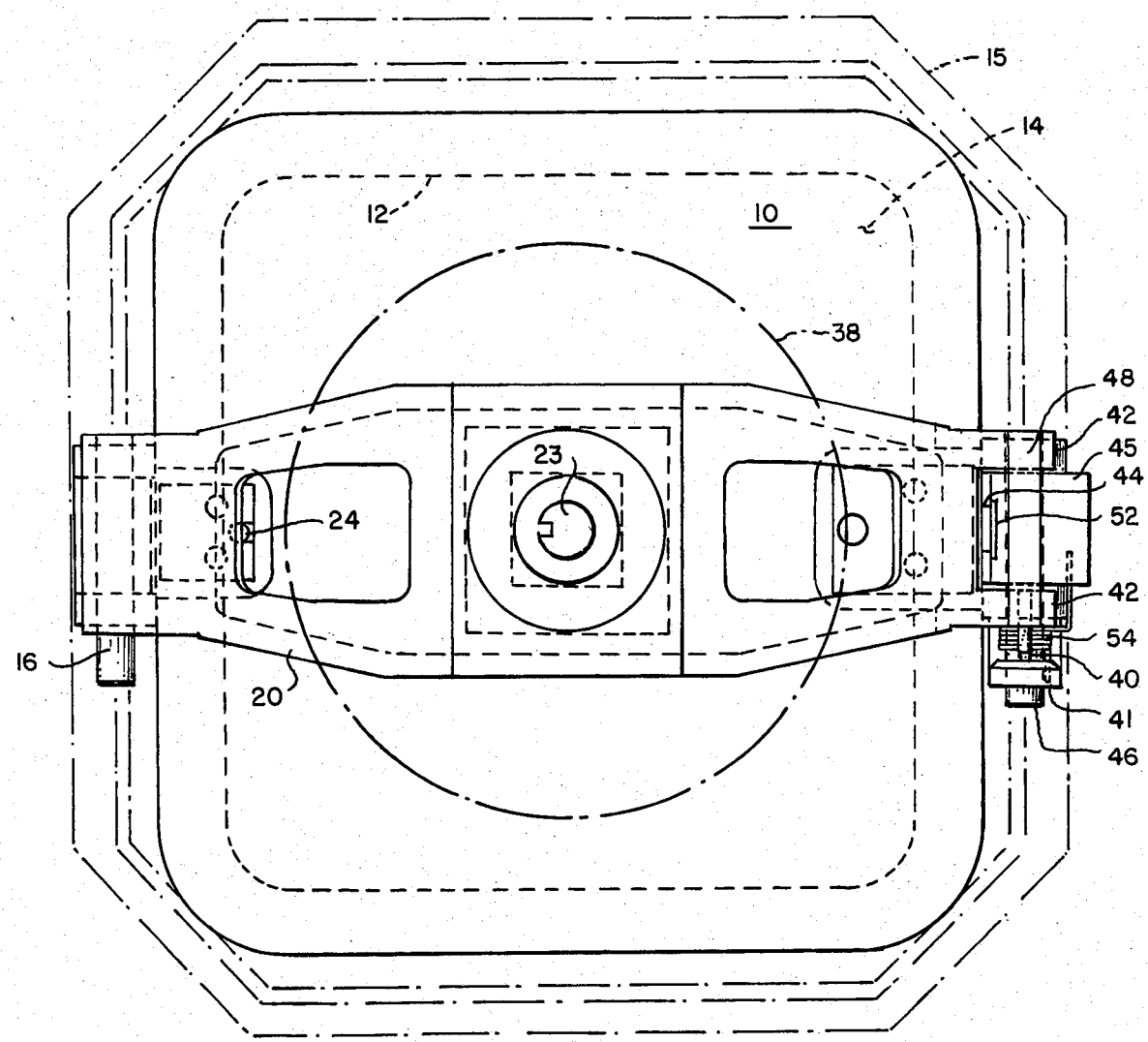
FIG. 1 is a front elevation view of the door closure system provided in the present invention shown with the outer door cover removed.

More particularly and with reference to FIG. 1, there is shown the vertical chamber door 10 mounted to the chamber housing 15 adjacent the chamber opening 12 by means of vertical pivotal hinge 16 affixed between the chamber housing 15 and a side edge of door 10. A sealing surface 18 of the chamber opening 12 is provided in facing relation to door 10. Door 10 is provided with a supporting transverse door beam 20 which extends from the hinge 16 side of door 10 and is movably supported by the hinge 16, to the opposite side of door 10. Inner door plate 22 is provided on the inside portion of door 10 and preferably consists of a metallic plate which is movably supported by door beam 20 by means of an Acme screw 23 (described below) and stabilized by slidable pin 24 such that door plate 22 is displaceable relative to door beam by means of Acme screw 23 toward and away from sealing surface 18 when the door 10 is closed. In particular, the door plate 22 may be in one of three positions: a confronting position in which door plate 22 is adjacently facing sealing surface 18 but is not sealing the chamber opening 12 from fluid flow; a sealed position in which fluid flow from chamber 14 via opening 12 is prevented; and, an open position in which the door plate 22 is not in either the confronting or sealed positions.

Affixed to the operative face of door plate 22 is a sealing member 26 which may consist of a compression-type seal and which will sealingly engage chamber sealing surface 18 when the door 10 is in its sealed position. Left mounting pad 28 and right mounting pad 30 are affixed to the respective edges of the reverse side of door plate 22 and serve to limit the travel of door plate 22 toward door beam 20. A threaded bore 32 having Acme threads disposed therein is provided in the central portion of door beam 20. The Acme screw 23 is provided to pass through threaded bore 32 and is loosely fitted to the reverse surface of door plate 22 by means of mounting socket 36, thus supporting the weight of door plate 22. A handwheel 38 is secured to the opposite end of Acme screw 23 such that by the rotation of handwheel 38, Acme screw 23 will be advanced or retracted within threaded bore 32 relative to door beam 20. As such, door plate 22 is thereby advanced or retracted relative to door beam 20 and, conversely, retracted from or advanced toward chamber sealing surface 18. A door cover 39 preferably consisting of a metallic sheet material is provided to surround the outside of door 10 to conceal the structural and operative components thereof.

In order to secure the end of door 10 opposite from hinge 16, upper and lower latch hoods 42 having upstanding bearing surfaces 43 formed thereon are provided to extend from the end of door beam 20 opposite from hinge 16. A downwardly oriented spring loaded detent 40 is preferably provided in the lower surface of lower latch hook 42 to cooperate with an indentation 41a provided in a mounting bracket 41 secured to the side of chamber opening 12 opposite from hinge 16 to retain door 10, and hence door plate 22, in the confronting position. In addition, an extended cam finger 44 is provided on right mounting pad 30 and extends outward from the door 10 in a direction away from hinge 16.

Figure 4:
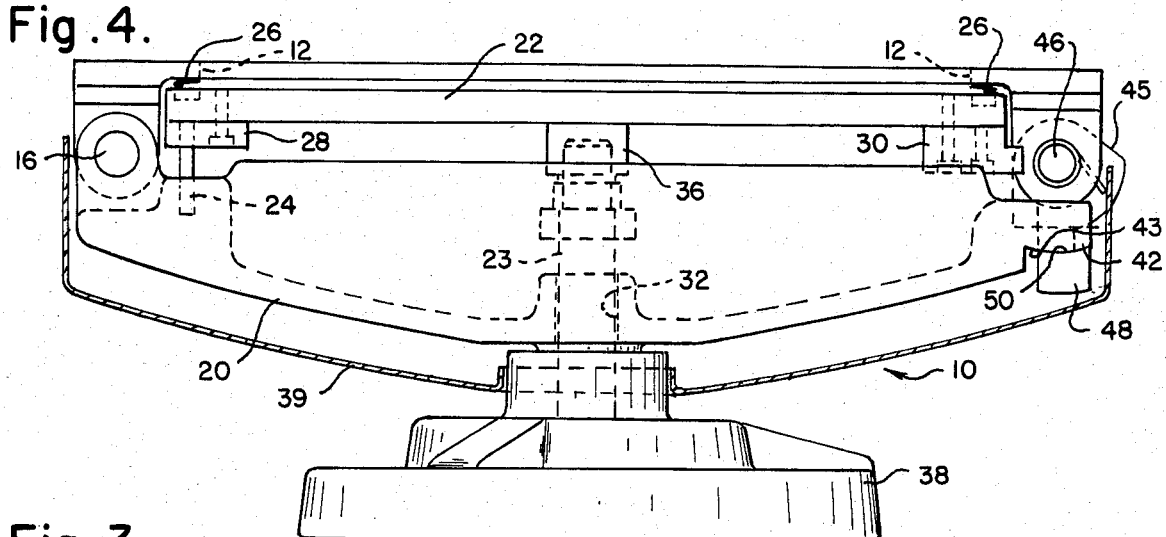
FIG. 4 is a plan section view of the door closure system provided in its sealed position.
Figure 3:
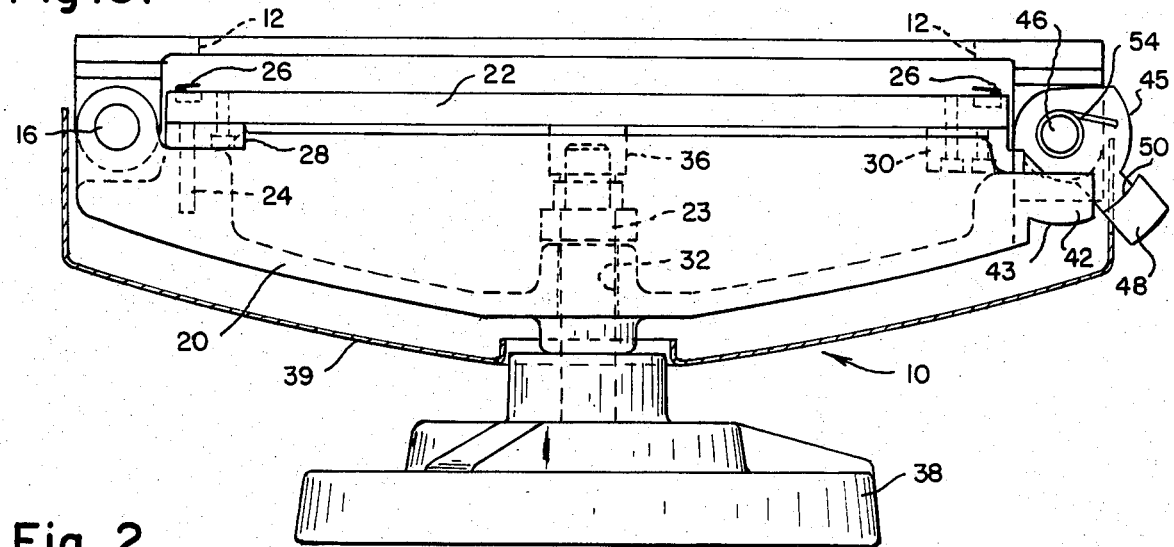
FIG. 3 is a plan section view of the door closure system provided in its confronting position.
Figure 2:
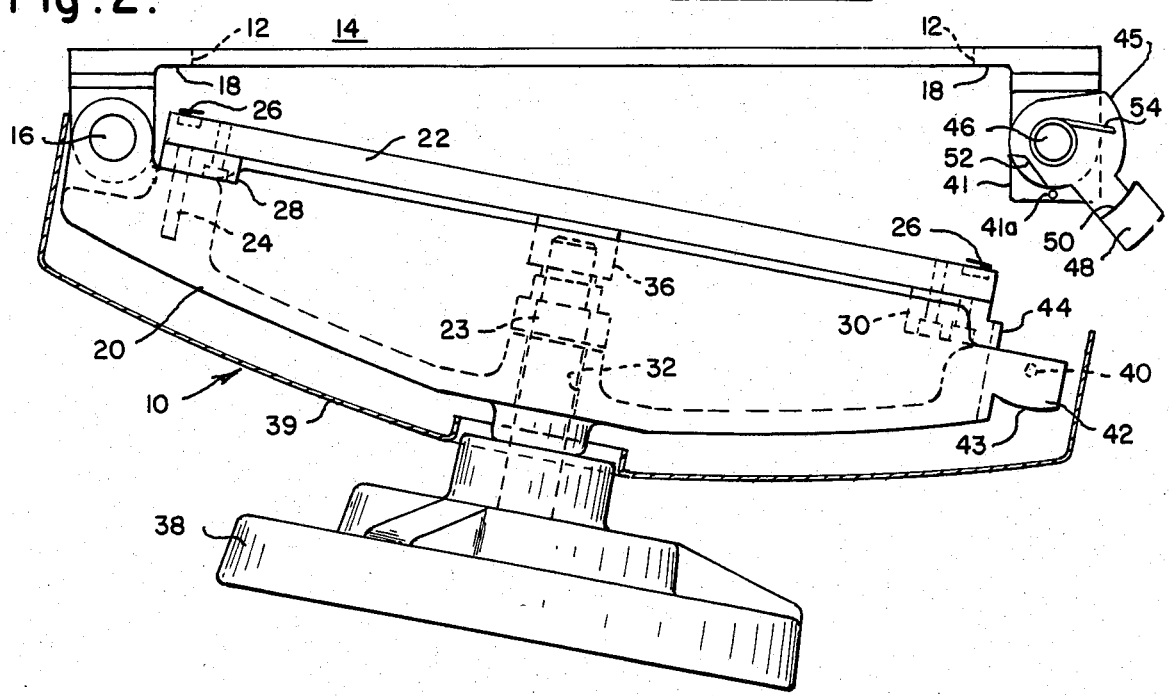
FIG. 2 is a plan section view of the door closure system provided with the door in an open position.

The means for securing the free end of door 10 includes a swing latch 45 vertically pivotally mounted on a pin 46 supported by mounting 41 which is affixed to chamber housing 15 adjacent the side of chamber opening 12 opposite from hinge 16. Swing latch 45 includes as extended bar member 48 having latch hook engaging surfaces 50 and a recessed cam surface 52 provided in facing relation to cam finger 44. As such, swing latch 45 is pivotable from an open position shown in FIGS. 2 and 3, into which swing latch 45 is normally urged by torsion spring 54, to a latched position with latch bar 48 engaging latch hoods 42 as shown in FIG. 4. Such pivoting of swing latch 45 is accomplished when the door 10 is retained in its confronting position by means of detent 41 and the handwheel 38 is rotated thereby moving door plate 22 and hence cam finger 44 toward chamber sealing surface 18. Such movement causes cam finger 44 to engage and ride along recessed cam surface 52. As such, the movement of cam finger 44 along recessed surface 52 and toward chamber opening 12 creates a moment force thereby pivoting swing latch 45 about pin 46 and causing hook engaging surfaces 50 to ride along bearing surfaces 43 until swing latch 45 is in its latched position with hook engaging surfaces 50 of latch bar 48 in facing engagement with bearing surfaces 43 of latch hooks 42. As such, door beam 20 is thereby retained from movement in the direction away from chamber opening 12. Such retention of door beam 20 is important because once the free end of door 10 is retained relative to chamber housing 15, the door plate 22 and door seal 26 may be advanced further toward and into sealing engagement with chamber sealing surface 18 by additional rotation of handwheel 38.

In operation, to close door 10 to seal chamber 14 the door 10 is manually pivoted about hinge 16 from its open position to a chamber opening 12 confronting position and retained there by detent 40 engaging the recessed area in mounting bracket 41. Next the handwheel 38 is rotated thereby moving door plate 22 in a direction away from door beam 20 and toward chamber sealing surface 18. During such movement a number of events occur simultaneously. The cam finger 43 is caused to engage and slide along recessed cam surface 52 thereby creating a moment force pivoting swing latch 45 about pin 46 against the force of spring 54 and moving hook engaging surfaces 50 of latch bar 48 into facing engagement with bearing surfaces 43 of latch hook 42. In order to move door 10 into its sealed position relative to sealing surface 18, the handwheel 38 is further manually rotated which causes Acme screw 23 to further move door plate 22 away from door beam 20 and along pin 24 and, hence, door seal 26 into sealing engagement with sealing surface 18. As will be appreciated by those skilled in the art, a limit switch (not shown) may be provided to prevent sterilizer activation until the door plate 22 has been displaced a sufficient amount to assure effective engagement of door seal 26 with sealing surface 18.

To open door 10 from chamber opening 12 the above process is reversed. The handwheel 38 is rotated in the opposite direction thereby withdrawing door plate 22 and seal 26 from chamber sealing surface 18 and then causing cam finger 44 to be retracted along cam surface 52. This movement does not release the latch bar 48 from the latch hooks 42 until door plate 22 is in chamber opening 12 confronting position and the swing latch 45 is in its open position. The door 10 may then be pivoted by handwheel 38 about hinge 16 from its confronting position to its open position. It is significant that the design of the present invention causes the swing latch 45 to be displaced without requiring any operator contact thereof as during the sterilization process the swing latch 45 may become quite hot and which could cause a burn to an operator if the operator were required to manually pivot swing latch 45 as is required by certain prior art designs.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for closing and sealing the opening of a chamber of a housing within which a desired level of pressure can be maintained comprising:
   a. a door pivotally supported on said housing adjacent to said chamber opening, said door being provided with an inner door plate movable relative to said door and supported by said door in facing relation to said opening, said door plate having a chamber opening sealing surface and being movable between a confronting position in which said door plate confronts the chamber opening but in which the chamber opening is not sealed, a sealing position in which the chamber opening is sealed from fluid flow and an open position in which said door plate is neither in said confronting nor said sealing positions;
   b. a hinge means affixed to one edge of said door for pivotally supporting said door adjacent said chamber opening so as to allow said door plate to be movable between said open and said confronting positions;
   c. a cam finger affixed to said door plate on the opposite edge thereof from the edge adjacent said hinge means;
   d. a latch hook means affixed to said door adjacent to said cam finger;
   e. a swing latch pivotally mounted on said housing adjacent to said chamber opening on the opposite side thereof from said hinge means and in facing relation to said latch hook means, said swing latch being provided with a latching bar capable of retaining said latch hook means and a cam surface in facing relation to said cam finger such that said swing latch is displaceable between a first position in which said door plate is in its confronting or open positions and said latching bar does not retainingly engage said latch hook and, by the engagement of said cam finger with said cam surface and the movement of said door plate between said confronting and sealed positions, a latched position in which said latch hook is retained by said latching bar;
   f. means for displacing said door plate between said confronting and said sealing positions; and,
   g. sealing means disposed between said door plate and said chamber opening so as to provide a pressure-resistant seal when said door plate is in said sealing position.

2. Apparatus of claim 1 in which said door further comprises a door beam affixed to said door and extending laterally of said door, said door beam being pivotally supported by said hinge means and supporting said door when said door plate is in its open position.

3. Apparatus of claim 2 in which the end of said door beam opposite from said hinge means is formed into said latch hook means.

4. Apparatus of claim 3 in which said means for displacing said door plate comprises:
   a. an apertured, threaded support member affixed to the central portion of said door beam;
   b. a screw member configured to be movably retained in said apertured support member;

c. means movably attached to said screw member and attached to said door plate such that said screw member movable supports said door plate; and d. means for rotating said screw member relative to said door beam such that the rotation of said screw member causes the threads thereof to travel relative to the threads of said apertured support member.

5. Apparatus of claim 4 in which said latch hook means is provided with parallel upper and lower extended tines which tines may be retainingly engaged by said latch bar when said swing latch is in its latched position.

6. Apparatus of claim 5 in which said cam surface of said swing latch comprises a recessed portion in said swing latch.

7. Apparatus of claim 7 in which said swing latch is normally urged to its first position by a spring means.

8. Apparatus of claim 7 further comprising a horizontal bracket for supporting said swing latch above said bracket, said bracket having a depressed area on the upper surface thereof adjacent to said swing latch.

9. Apparatus of claim 8 further comprising a detent affixed to the lower surface of said lower extended tine and configured so that when said door plate is in said confronting position, said detent engages said depressed area on the upper surface of said horizontal bracket so as to releasably retain said door plate in said confronting position.

10. Aparatus of claim 9 in which said sealing means comprises a compression seal.

* * * * *

UNITED STATES PATENT AND TRADEMARK OFFICE
CERTIFICATE OF CORRECTION

PATENT NO. :  4,607,760
DATED       :  August 26, 1986
INVENTOR(S) :  John N. Roche It is certified that error appears in the above—identified patent and that said Letters Patent is hereby corrected as shown below:

Col. 4, line 46, delete "hoods" and substitute therefor --hooks--;
    Col. 4, line 64, delete "as" and substitute therefor --an--;
    Col. 5, line 2, delete "hoods" and substitute therefor --hooks--; and
    Col. 7, line 3, delete "movable" and substitute therefor --movably--.

Signed and Sealed this

Sixteenth Day of December, 1986

Attest:

DONALD J. QUIGG

Attesting Officer      Commissioner of Patents and Trademarks